(12) United States Patent
Wang

(10) Patent No.: US 8,960,943 B2
(45) Date of Patent: Feb. 24, 2015

(54) LIGHTED DISPLAY HAVING PORTIONS PRINTED WITH A COATING CONTAINING LIGHT BENDING PARTICLES

(76) Inventor: Jessica Wang, Taipei (TW)

(*) Notice: Subject to any disclaimer, the term of this patent is extended or adjusted under 35 U.S.C. 154(b) by 261 days.

(21) Appl. No.: 13/589,980

(22) Filed: Aug. 20, 2012

(65) Prior Publication Data
US 2013/0088859 A1 Apr. 11, 2013

Related U.S. Application Data

(60) Provisional application No. 61/564,794, filed on Nov. 29, 2011, provisional application No. 61/626,992, filed on Oct. 5, 2011.

(51) Int. Cl.
*F21V 5/00* (2006.01)
*B23P 17/00* (2006.01)

(52) U.S. Cl.
CPC .. *B23P 17/00* (2013.01); *F21V 5/00* (2013.01)
USPC ........................................................ 362/124

(58) Field of Classification Search
None
See application file for complete search history.

(56) References Cited

U.S. PATENT DOCUMENTS 7,661,847 B2 * 2/2010 Wang ...................... 362/249.16
7,789,521 B2 * 9/2010 Li .................................. 362/121

OTHER PUBLICATIONS

"Target: 10 Orange Pumpkin Incandescent String Lights," © 2011 Target Brands, Inc., <http://www.target.com/p/10-Orange-Pumpkin-Incandescent-String-Lights/-/A-13488147> [retrieved Oct. 25, 2011], 5 pages.

* cited by examiner

*Primary Examiner* — Britt D Hanley
(74) *Attorney, Agent, or Firm* — Seed IP Law Group PLLC

(57) ABSTRACT

A decorative lighting fixture includes a frame, a light source, a sheer layer, a coating, and a plurality of light bending particles. The frame has at least a structural element adapted to form a three dimensional shape that includes an interior and an exterior. The light source is positioned within the frame or may be external. The sheer layer extends over at least a portion of the frame so light from the light source passes through at least a portion of the sheer layer as it exits or enters the fixture. A coating is located on at least a portion of an external and/or internal surface of the fixture. The light bending particles are coupled to the coating such that light colliding with the light bending particles is altered to create a desired visual effect. Methods for making the decorative lighting fixture are also provided.

33 Claims, 20 Drawing Sheets

LIGHTED DISPLAY HAVING PORTIONS PRINTED WITH A COATING CONTAINING LIGHT BENDING PARTICLES

CROSS REFERENCES TO RELATED APPLICATIONS

This application claims the benefit under 35 U.S.C. §119 (e) of U.S. Provisional Patent Application No. 61/564,794, filed Nov. 29, 2011, and Provisional Patent Application No. 61/626,992, filed Oct. 5, 2011, both of which are incorporated herein by reference in their entirety.

FIELD OF THE INVENTION

This invention relates generally to lighted displays, and more particularly, to an improved lighted display having portions printed with a coating containing elements that reflect, refract, diffract or otherwise bend and/or break up light.

BACKGROUND OF THE INVENTION

In order to heighten a festive atmosphere, lighted displays made in specific shapes can be displayed. Embodiments of various lighted displays are described in many of the inventor's United States Patents, including: U.S. Pat. Nos. 7,878,685, 7,682,060, 7,661,847, 7,585,091, 7,303,312, 7,086,757, 6,830,361, and U.S. Pat. No. 6,719,440, all of which are incorporated herein by reference in their entireties.

SUMMARY OF THE INVENTION

According to one embodiment, a decorative lighting fixture includes a frame, a light source, a sheer layer, a coating, and a plurality of light bending particles. The frame has at least a structural element adapted to form a three dimensional shape that includes an interior and an exterior. The light source may be positioned within the frame or may be an external light source. The sheer layer extends over at least a portion of the frame such that light from the light source passes through at least a portion of the sheer layer as it exits the fixture. A coating is located on at least a portion of an external surface or an internal surface of the lighting fixture. The light bending particles are coupled to the coating such that light colliding with the light bending particles is altered to create a desired visual effect.

According to another embodiment, a method for making a lighting fixture includes providing a sheer layer, manufacturing a frame in a three dimensional shape that includes an interior and an exterior, coupling lighting elements to the frame, wrapping the sheer layer over at least a portion of the frame; and positioning a coating embedded with light bending particles on at least a portion of an external surface or an internal surface of the lighting fixture.

BRIEF DESCRIPTION OF THE DRAWINGS

The drawings discussed in the detailed description of this invention are described briefly as follows, in which.

DETAILED DESCRIPTION OF THE INVENTION

Figure 1:
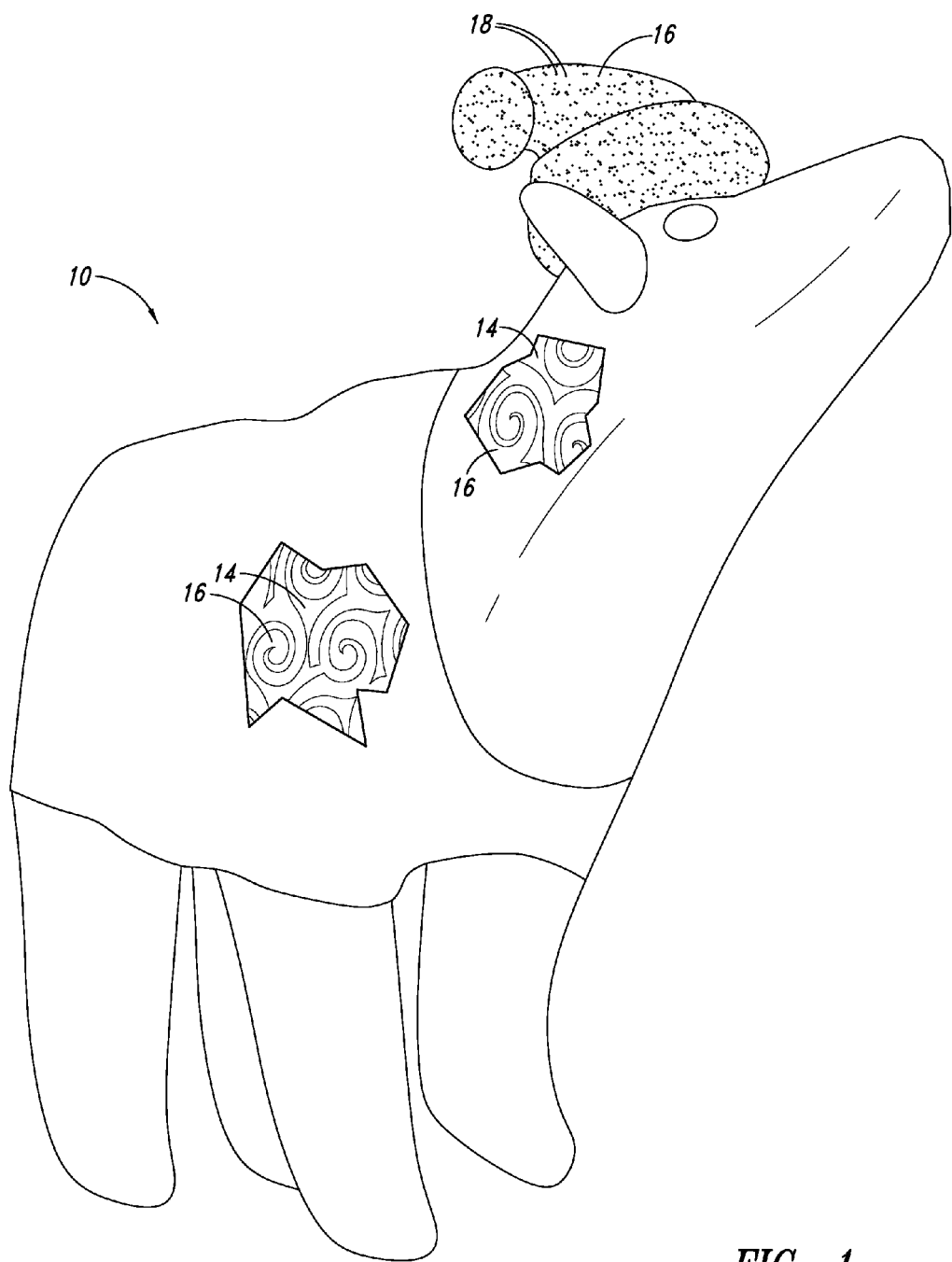
FIG. 1 is a perspective view of a lighted display according to an embodiment of the present invention.

The present disclosure is directed toward lighted displays. In certain embodiments, the lighted displays incorporate a sheer external layer printed with coatings containing elements that reflect, refract, diffract, or otherwise bend and/or break up light as the light contacts the element. As explained in greater detail below, the coatings containing elements can be printed on an exterior surface of the external layer, an interior surface of the external layer, or both. Other embodiments utilize both an internal and an external layer, with coatings printed on one or both of the layers. Other embodiments utilize an external layer and an insert piece, with coatings printed at least on the insert piece. Certain details of selected embodiments, and selected methods for making certain embodiments, are discussed below and illustrated in the associated images and schematics. Additionally, like reference numerals may be used herein repeatedly to designate identical or similar features depicted in the various drawings. An individual of ordinary skill in the art, having reviewed the following disclosure and drawings in their entireties, will appreciate that many of the details shown and described can be modified, and some eliminated, without deviating from the spirit of the invention.

FIG. 1 illustrates a lighted display 10 according to one embodiment of the present invention. The illustrated display 10 is in the shape of a polar bear, and is primarily white and wearing a red and white hat. The polar bear in the illustrated display 10 has a particular spiral shapes pattern, as shown in the two partial detail views and discussed further below. The red hat of the illustrated display 10 is covered with a red and a white coating embedded with glitter or other refractive substance. This particular embodiment, in the shape of a polar bear, is assembled by coupling six pieces: four legs, head, and body together; however, as can be appreciated by one skilled in the ordinary art, the illustrated display 10 may be made as a single unit or broken into several more components, rather than the six mentioned above.

While the illustrated display 10 of this particular embodiment is in the shape of a polar bear, the illustrated display can be in the shape of a different animal, could be in the shape of a human or fanciful character, or could be in the shape of an inanimate object. Depending on the occasion on which the display 10 is to be used, individuals will desire having a wide variety of shapes, colors, color combinations, and accessories. All shapes, colors, color combinations and accessories are considered to fall within the scope of the present invention.

Figure 2:
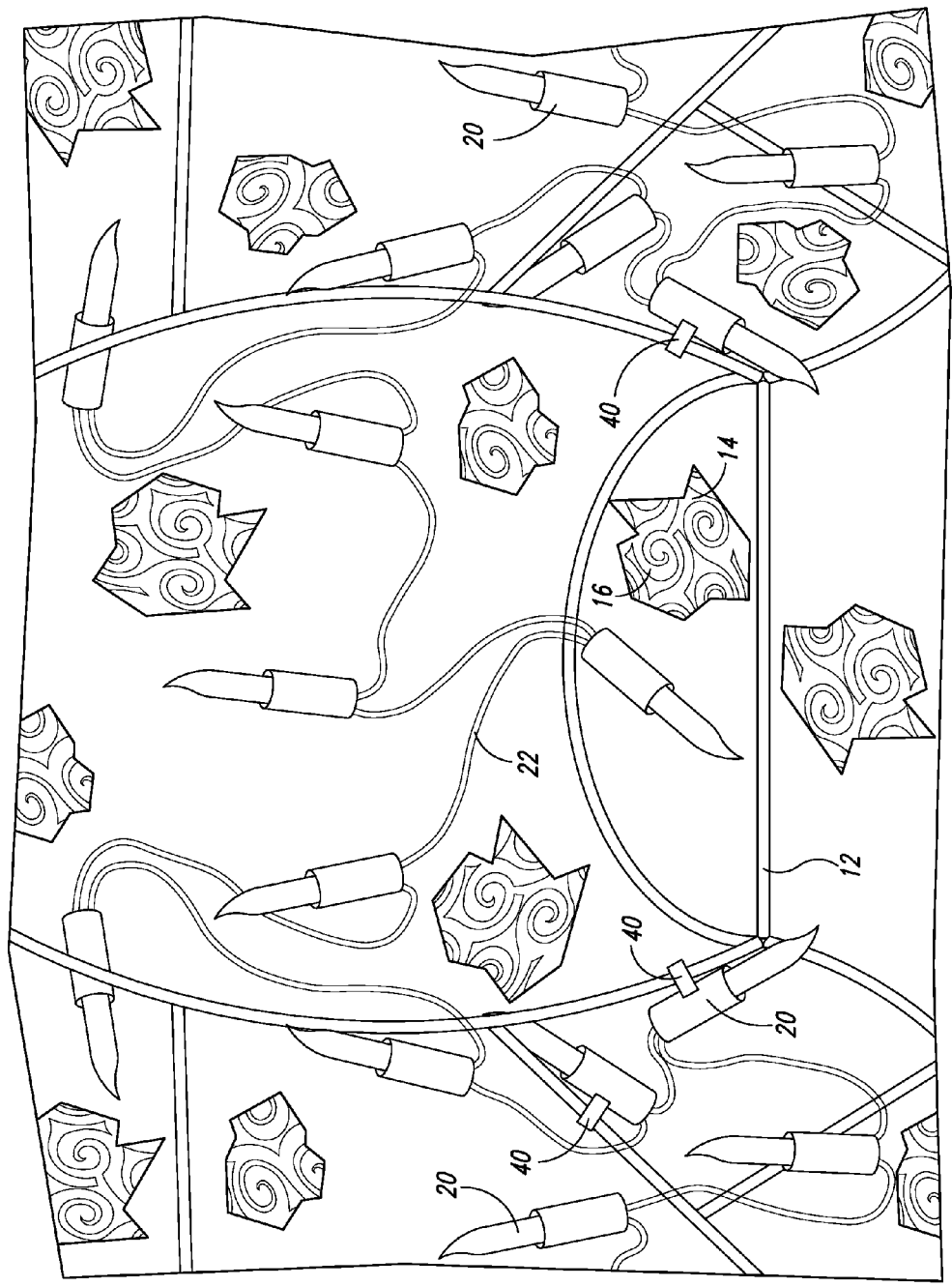
FIG. 2 is an elevation view of the inside of the lighted display of FIG. 1.
Figure 3:
FIG. 3 is a side elevation view of the lighted display of FIG. 1.
Figure 4:
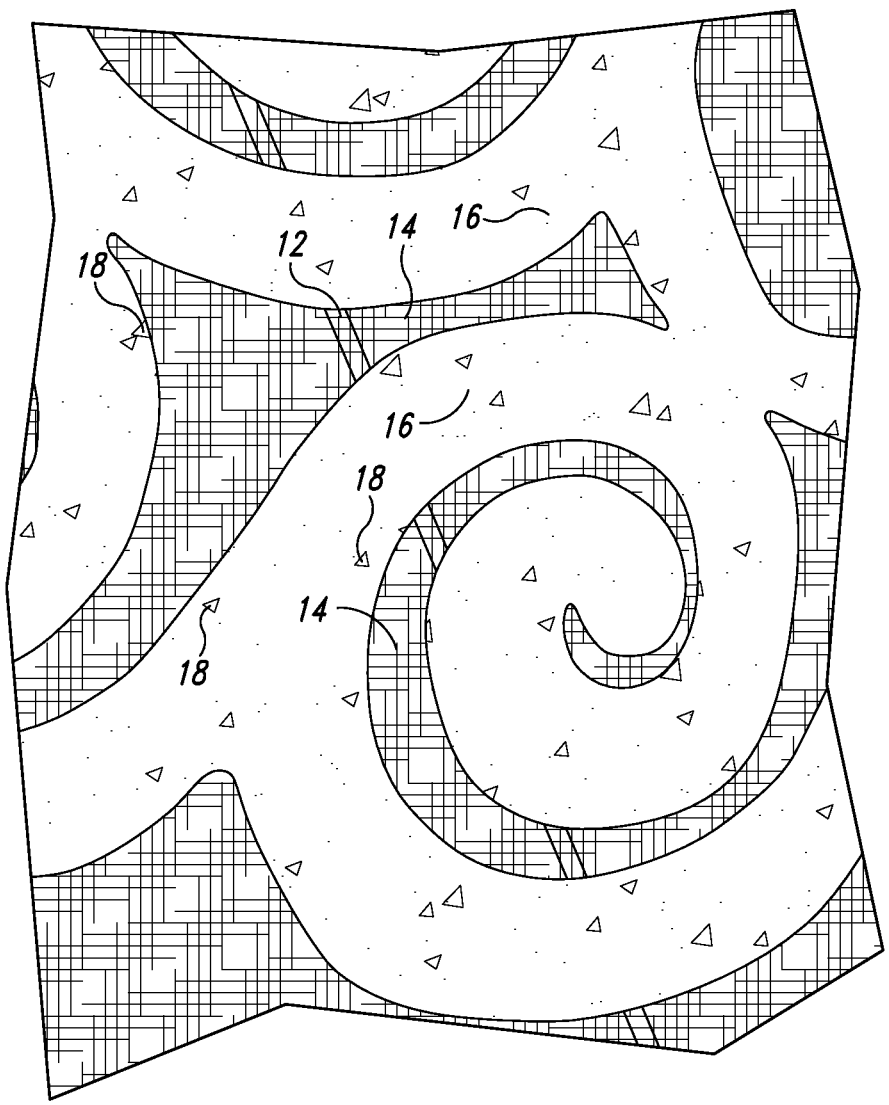
FIG. 4 is an enlarged side elevation view of the lighted display of FIG. 1.

As further illustrated in FIGS. 2-4, the illustrated display 10 is a wire frame sculpture manufactured from rods 12 formed and interconnected to create a frame having the desired shape. In the illustrated embodiment, the rods 12 are metal rods that have been bent, welded together, and painted to conform to the desired color of the display 10.

The rods 12 could instead be made from plastic, nylon, wood or any other suitable material; they could be injection molded or otherwise formed into their desired shapes; and they could be glued, tied or otherwise connected together. Further, the frame need not be a wire frame sculpture; it instead could be a flat panel wall display, a double-sided lawn display, or any other type of display suitable for use with the present invention, provided it otherwise falls within the scope of one of the following claims.

The rods 12 making up the illustrated display 10 collectively form a frame that is covered, at least in part, with a sheer layer 14. In the illustrated embodiment, the sheer layer 14 is one or more sheets of sheer fabric that have been stretched and wrapped around the rods 12 of the display 10 to form a skin-like external cover, and that are attached to points around the display 10 to remain taut. The illustrated sheer layer 14 is a woven fabric that has been cut into desired shapes, stretched over some of the rods 12, wrapped around portions of the display 10, and attached at its edges to the rods.

The illustrated sheer layer 14 is configured to allow light to pass through it; it may be translucent and/or transparent, depending on the desired lighting and visual effects. The sheer layer 14 can have one or more selected colors to help create a desired overall visual effect; for example, white fur, a red hat, a silver leaf, etc. Any particular display 10 can be a single uniform color or multiple colors, depending on the desired appearance.

The sheer layer 14 could be made from woven nylon, silk, cotton, or any other suitable thread; it could instead be made from a polymer or other type of foil, or from Mylar or another type of film; or it could be made from any other material or construction known in the art. The edges of the sheer layer 14 can be wrapped or twisted around some of the rods 12, can be glued to the rods 12, or can be otherwise affixed to the display 10. An individual, having reviewed this entire disclosure, will immediately appreciate the possible variations that can be made.

The sheer layer 14 has a coating 16 thereon containing light bending particles 18. The illustrated coating 16 is made from a colloidal PET that has been printed onto the sheer layer 14. The coating 16 can have any desired color, and can have different colors in different places on the display 10. The illustrated coating 16 has a repeating pattern of spiral shapes, with uncoated portions of the sheer layer 14 interposed between the coated portions. The patterns or other shapes of the coating 16 can be created by screen printing or any other known process.

The illustrated light bending particles 18 are in the form of glitter, some of which can be treated to break up light, either as it passes through the light bending particle or as it reflects off of the light bending particle. The light bending particles 18 can be made from a polymer or other material, such as Mylar, and can be small pieces of a foil or sheet. The light bending particles 18 can be treated to create a holographic or spectral effect, can have diffracting features, can be translucent and/or transparent, can bend light as the light passes through it, and can otherwise reflect, refract, break up and/or bend light as the light comes into contact with the light bending particles.

During the day, or in an area with ambient light, the light bending particles 18 can reflect, refract and otherwise alter the exterior light contacting the outer surface of the display 10. This feature can create a sparkling, brilliant effect when viewed by an individual near the display 10.

In addition to reflecting and otherwise altering light originating outside the display 10, the display 10 contains lighting elements 20 that create light internally with respect to the display 10. As best seen in FIG. 2, the lighting elements 20 are spaced about inside the display 10, and are connected by one or more wires 22 in a light string. The illustrated lighting elements 20 are light bulbs; however, LED lights or other known forms of lighting elements could instead be used, as necessary or desirable based on the display 10, design specifications or customer requests. The illustrated lighting elements 20 are clipped to the rods 12 via integral clips 40, making up the frame of the display 20; however, any known form of fastener, adhesive or other attachment means could be equally effective. In other embodiments, the lighting elements 20 could be attached to other portions of the display, or could be strung across openings in the display.

Light emitted by the lighting elements 20 exits the display 10 through the sheer layer 14, illuminating the display. As visualized in FIG. 4, light exiting the display 10 reflects and refracts when it contacts the light bending particles 18 embedded in the coating 16. Further, the coating 16 patterns create designs by blocking light in the shape of the pattern, such as the swirl patterns visualized in FIGS. 3 and 4, for example, thus adding to the illuminated features of the display 10.

Figure 5A:
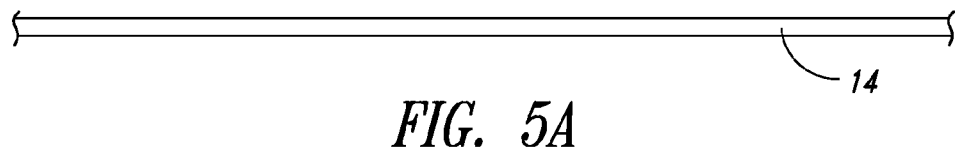
FIGS. 5A-5E are a series of schematic drawings sequentially illustrating some of the steps in a process for printing an external layer of a lighted display according to an embodiment of the present invention.

FIGS. 5A-5E consecutively illustrates one method of manufacturing the display 10. In FIG. 5A, the process begins with an untreated, uncoated piece of the sheer layer 14. The sheer layer 14 can be in the form of a roll or in another form, and can be stretched across a platen or other substrate for processing.

Figure 5B:
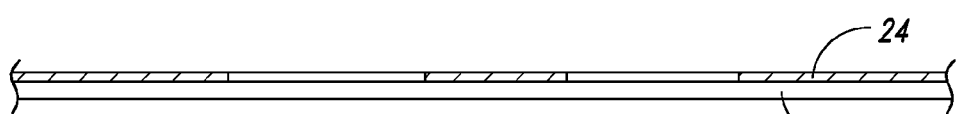

In FIG. 5B, a screen 24 is placed over portions of the sheer layer 14. The screen 24 has a shape complementary to the desired shape of some or all of the portions of the coating 16, depending on whether the coating 16 will be printed in a single screening or in multiple screenings. An individual of ordinary skill in the art, having reviewed this entire disclosure, will immediately appreciate the process of screen printing in this respect.

Figure 5C:
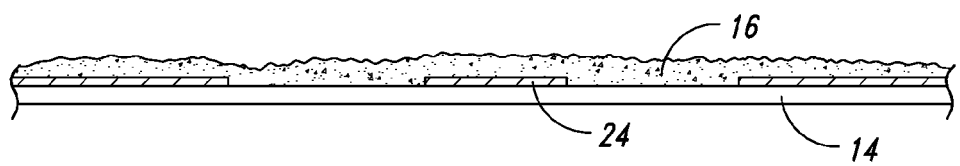

In FIG. 5C, the liquid or other form of coating 16 is applied over the top of the sheer layer 14 and the screen 24. The coating 16 can be sprayed on, put on or spread with a squeegee, or applied to the sheer layer 14 and screen 24 using other known methods.

Figure 5D:
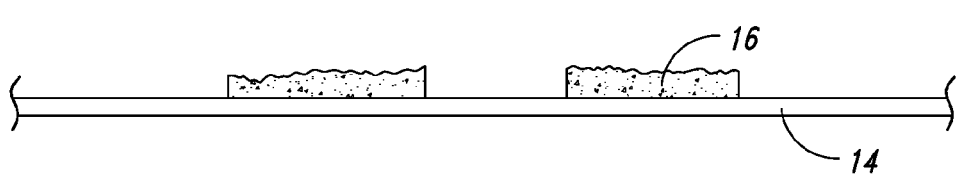

In FIG. 5D, the screen 24 has been removed, leaving only the coating 16, in the desired pattern or shape, on the sheer layer 14.

Figure 5E:
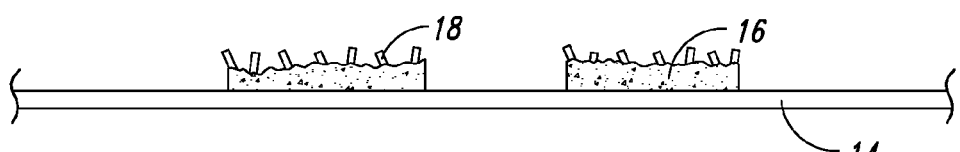

In FIG. 5E, the light bending particles 18 have been distributed across the top surface of the coating 16 before the coating has dried. As a result, the light bending particles 18 bond to the exterior surface of the coating 16. The light bending particles 18 do not bond to the areas of the sheer layer 14 where there is no coating 16. In an alternate embodiment, an adhesive could be applied to the coating 16 after the coating has dried, and the light bending particles 18 can be distributed about the adhesive.

Figure 5F:
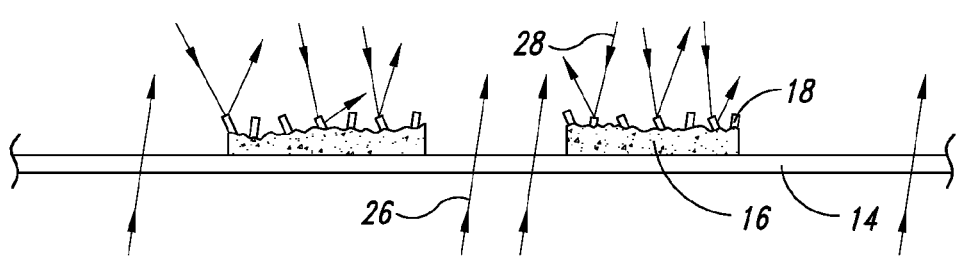
FIG. 5F is a schematic drawing illustrating the external layer made through the steps illustrated in FIGS. 5A-5E, during operation.

FIG. 5F illustrates the display 10 having a sheer layer 14 treated as described immediately above, during use. Beams of interior light 26 escape the display 10 through portions of the sheer layer 14 not covered by the coating 16, while beams of exterior light 28 reflect off of the light bending particles 18, creating a brilliant effect.

Figure 6:
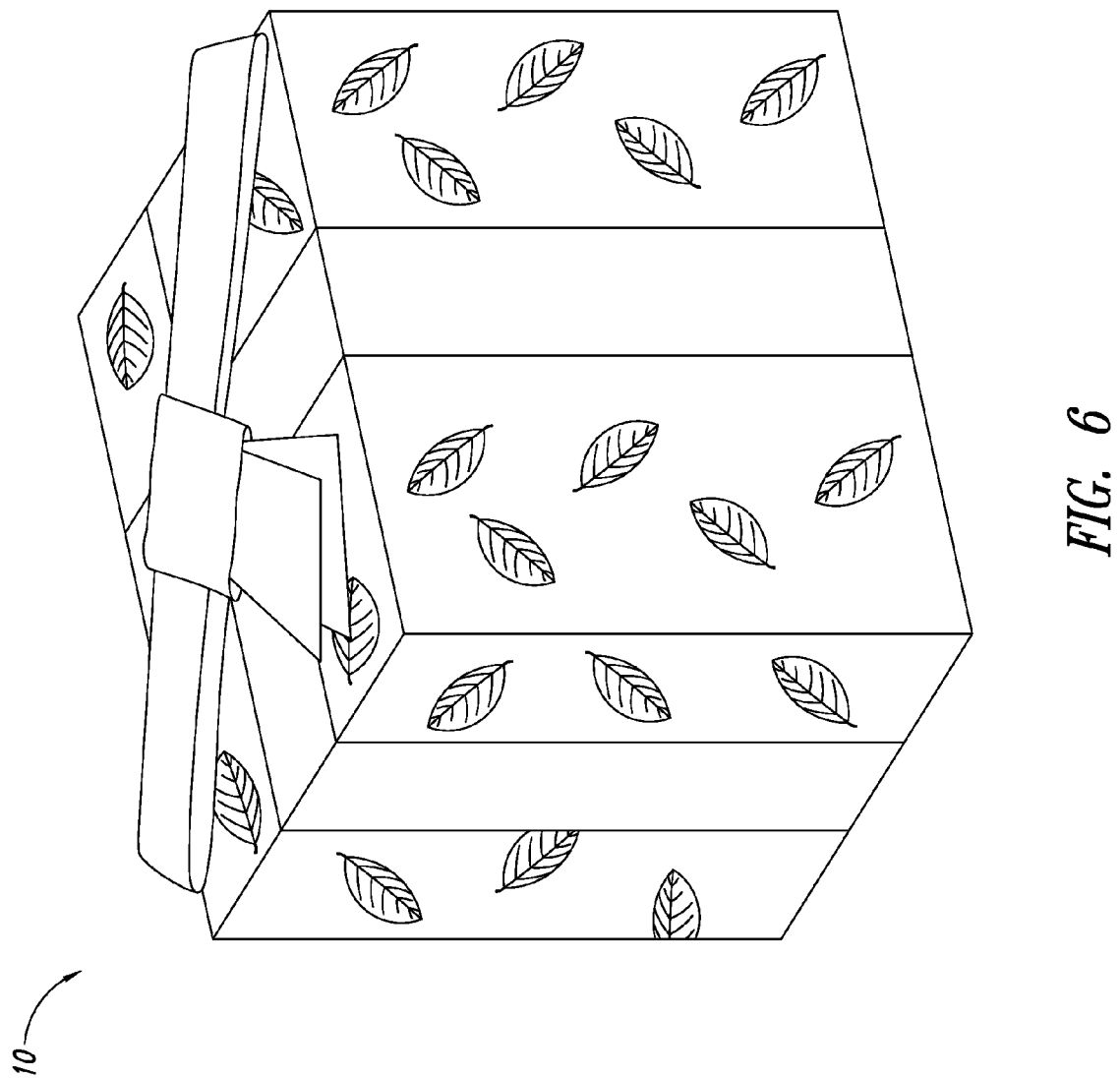
FIG. 6 is a perspective view of a lighted display according to an embodiment of the present invention.
Figure 7:
FIG. 7 is a side elevation view of the lighted display of FIG. 6.
Figure 8:
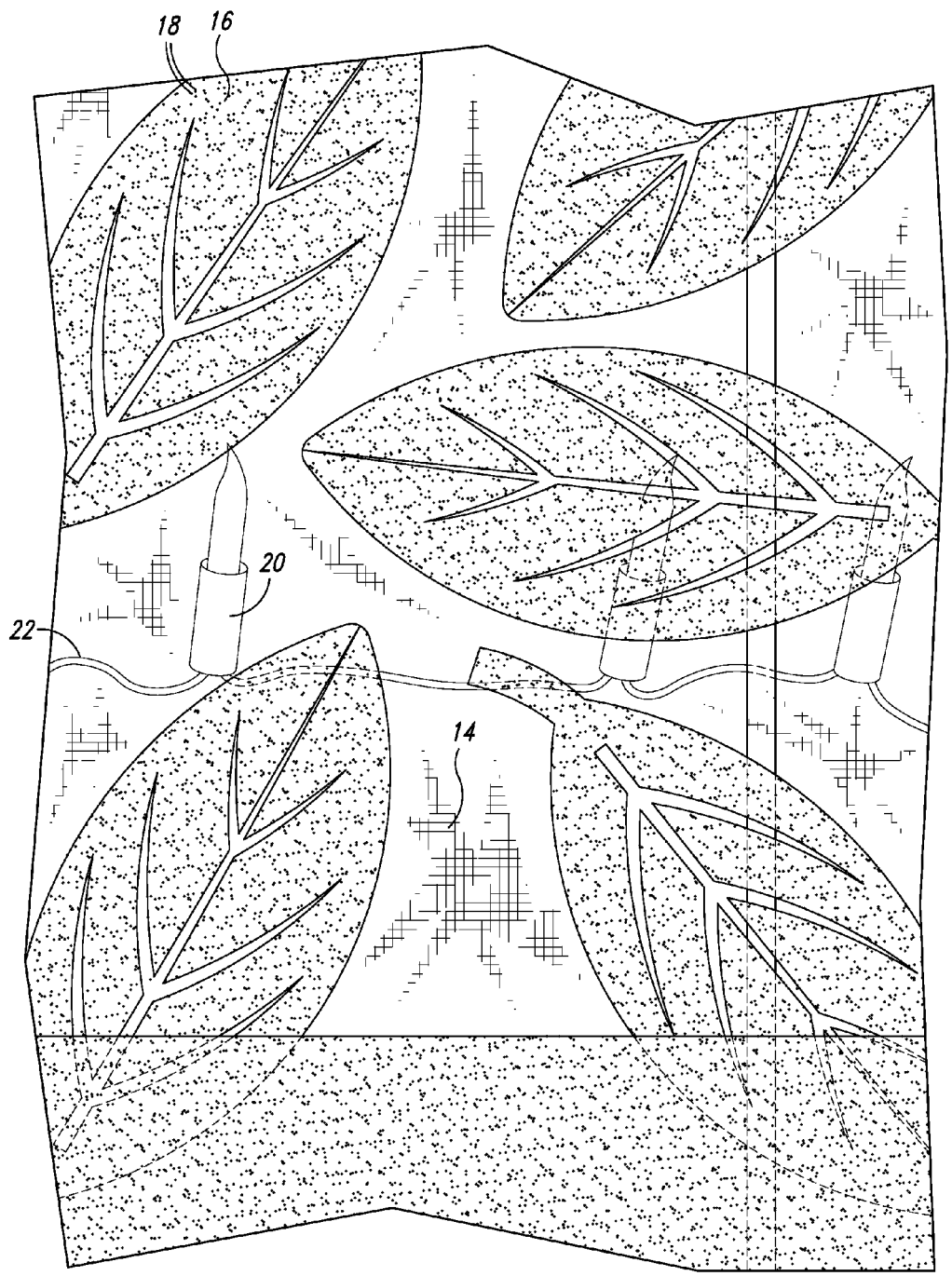
FIG. 8 is an enlarged side elevation view of the lighted display of FIG. 6.

FIGS. 6-8 illustrate an alternate embodiment of the device, in the form of a wrapped present. As discussed below, this alternate embodiment, and other embodiments of the display 10, can be coated and treated in a manner that bends and/or breaks up light not only when it collides with the outside of the display, but also as it leaves the display and passes through the coating 16 and the light bending particles 18.

Figure 9A:
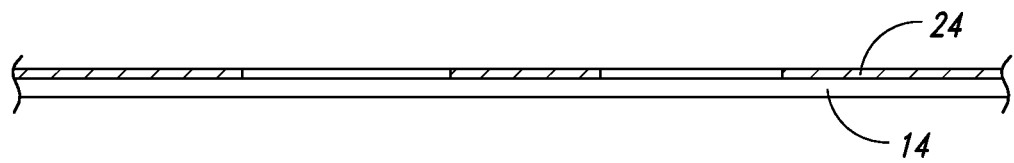
FIGS. 9A-9C are a series of schematic drawings sequentially illustrating some of the steps in a process for printing an external layer of a lighted display according to an embodiment of the present invention.

FIGS. 9A-D illustrate steps in an alternate method of making a display 10 according to the present invention. In FIG. 9A, the sheer layer 14 and screen 24 have been positioned for printing or other application of the coating 16.

Figure 9B:
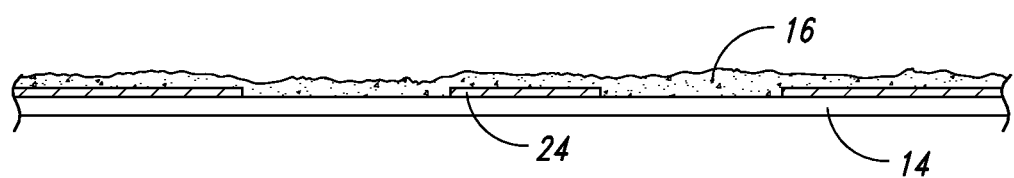

In FIG. 9B, the coating 16 is applied over the top of the sheer layer 14 and the screen 24. In this particular embodiment, the coating 16 can be applied thinner than in the previous version, and/or it can be thinned using a squeegee or other device.

Figure 9C:
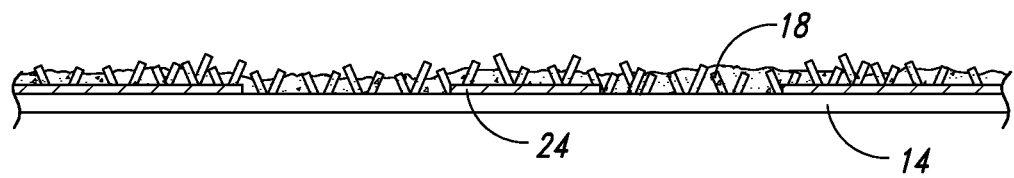

In FIG. 9C, the light bending particles 18 are applied to the coating 16. Because the coating 16 is extremely thin in this example, some of the light bending particles 18 penetrate completely through the coating 16, contacting the sheer layer 14 underneath the coating.

Figure 9D:
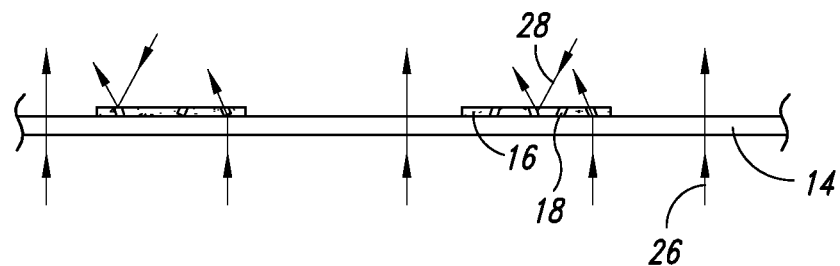
FIG. 9D is a schematic drawing illustrating the external layer made through the steps illustrated in FIGS. 9A-9C, during operation.

FIG. 9D shows this embodiment of the display 10 during use. As with the prior embodiment, some of the exterior light 28 that contacts the display 10 collides with the light bending particles 18 and reflects back. In addition, some of the interior light 26 passes through the sheer layer 14, also passes through the light bending particle 18, refracts and, after being bent, exits the display 10. This combined effect also creates a brilliant effect. The interior light 26 and/or the exterior light 28 can also be altered by holographic or spectral features contained in or on the light bending particles 18.

FIGS. 10A-10D illustrate another embodiment of the device, in which the lighted display 10 is in the shape of a ghost. An interior of the ghost is visible through openings 30, which are in the shape of the eyes and mouth of the ghost. As discussed in greater detail below, the interior surface of the display 10 is selectively coated and treated in a manner that bends and/or breaks up light, to provide an elegant appearance through the openings 30. Moreover, one skilled in the relevant art will also recognize that the openings 30 can be configured in a desired manner to achieve a diffraction effect. In this embodiment, the exterior color of the ghost is white, and the selectively coated interior surfaces are orange.

Figure 10A:
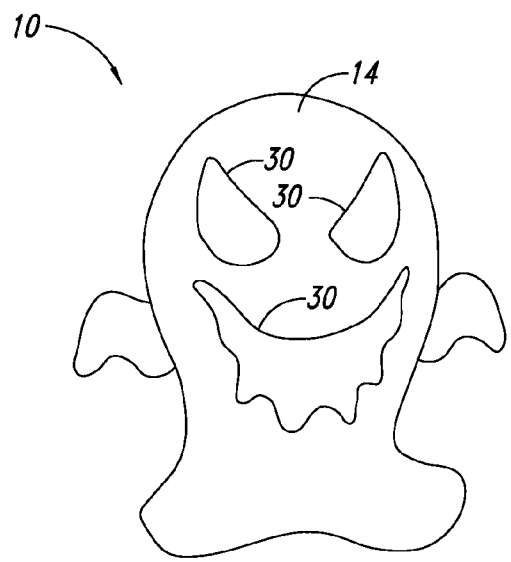
FIG. 10A is a perspective view of a lighted display according to an embodiment of the present invention.
Figure 10B:
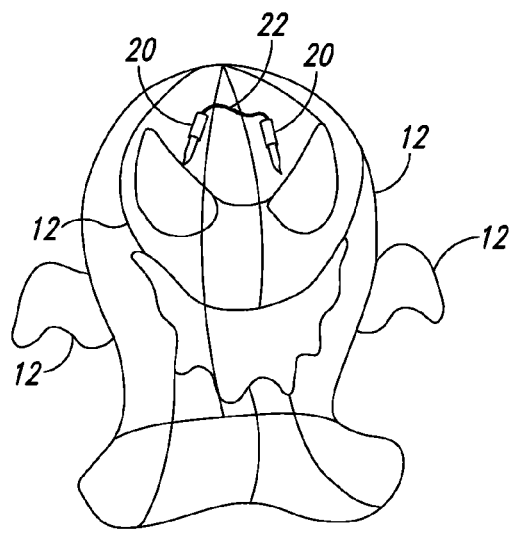
FIG. 10B illustrates a frame of the lighted display illustrated in FIG. 10A.

FIG. 10B is a schematic view of the lighted display of FIG. 10A depicted without any sheer layer 14, for illustrative purposes. As with the display 10 in FIGS. 1-4, the display 10 of FIG. 10B is wire frame sculpture manufactured from rods 12 formed and interconnected to create a frame having the desired shape. As previously noted, the rods 12 could instead be made from metal, plastic, nylon, wood or any other suitable material; they could be injection molded or otherwise formed into their desired shapes; and they could be glued, tied or otherwise connected together. The display 10 contains lighting elements 20 that create light internally with respect to the display 10.

Figure 10C:
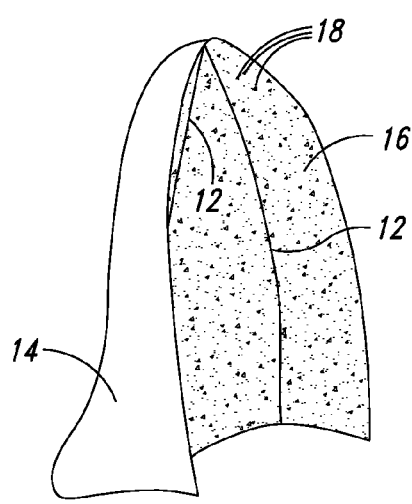
FIG. 10C illustrates a partial cutaway perspective view of back portion of the lighted display illustrated in FIG. 10A.
Figure 10D:
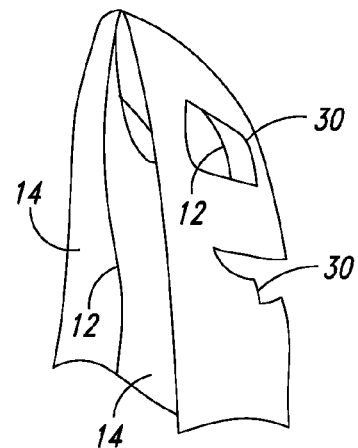
FIG. 10D illustrates a partial cutaway perspective view of front portion of the lighted display illustrated in FIG. 10A.

The above-noted selective coating of the interior surface of the display 10 is best seen in FIGS. 10C and 10D. FIGS. 10C and 10D are partial cutaway views of the display 10 of FIG. 10A. FIG. 10C illustrates a portion of the back half of the display 10 from FIG. 10A, and FIG. 10D illustrates a portion of the front half of the display from FIG. 10A. A shown in FIG. 10C, the interior surface of the sheer layer 14 mounted on the back half of the display 10 includes a coating 16 containing light bending particles 18. On the other hand, as shown in FIG. 10D, the interior surface of the front half of the display 10 does not include either a coating 16 or light bending particles 18.

As discussed in greater detail below, the interior surface of the display 10 can be coated by a variety of different methods. For example, the sheer layer 14 can be coated on an interior-facing side prior to or after mounting to the rods 12 of the frame of the display. Another option would be to supply a second layer in addition to the layer 14 that includes a coating on an interior-facing side. In another option, a coated insert is used to create a sparkling effect.

Figure 10E:
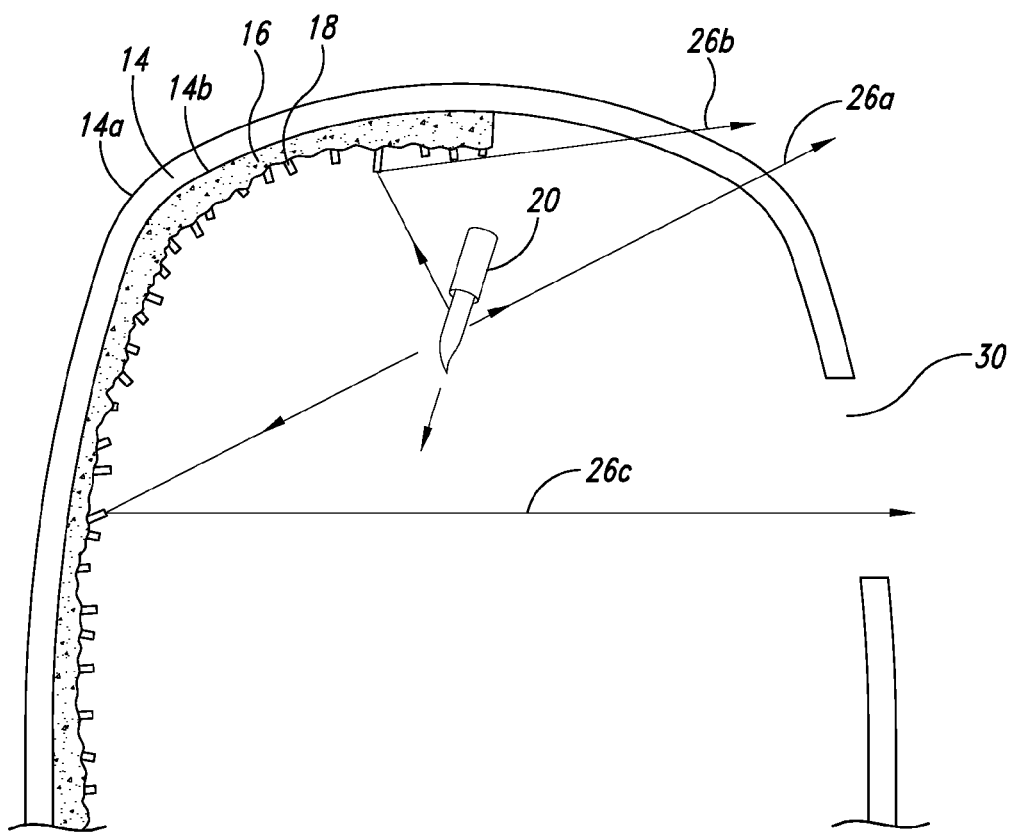
FIG. 10E is a schematic drawing illustrating a cutaway side view of the external layer of the lighted display of FIG. 10A, during operation.

The effects of this design on the appearance of the display 10 during operation can be understood with reference to the schematic drawing shown in FIG. 10E, which is a partial cutaway view of the device 10 of FIG. 10A during operation. In the example in FIG. 10E, the sheer layer 14 has been coated on an interior-facing side of the display 10. The sheer layer 14 of the device 10 includes an inner surface 14b and an outer surface 14a. The back half of the inner surface 14b of the sheer layer 14 includes a coating 16 containing light bending particles 18. This configuration creates a dazzling effect when a lighting element 20 is illuminated within the display 10. In particular, some of the light beams from the lighting element 20 pass through the uncovered portions of the sheer layer 14 (illustrated as beams 26a); other light beams from the lighting element 20 reflect off the surface of the light bending particles 18 on the interior surface of the display 10 and then pass through the uncovered portions of the sheer layer 14 (illustrated as beams 26b); and still other light beams from the lighting element 20 reflect off the surface of the light bending particles 18 on the interior surface of the display 10 and then pass through the openings 30 in the display 10 (illustrated as beams 26c). As noted above, the coating 16 has an orange color and the sheer layer 14 has a white color in this embodiment. Thus, beams of light from the lighting element 20 not only illuminate the display 10 through the uncovered portions of the sheer layer 14, but also present a brilliant spectral effect that is visible through the openings 30 when the beams of light are refracted off of the bending particles 18.

Figure 11B:
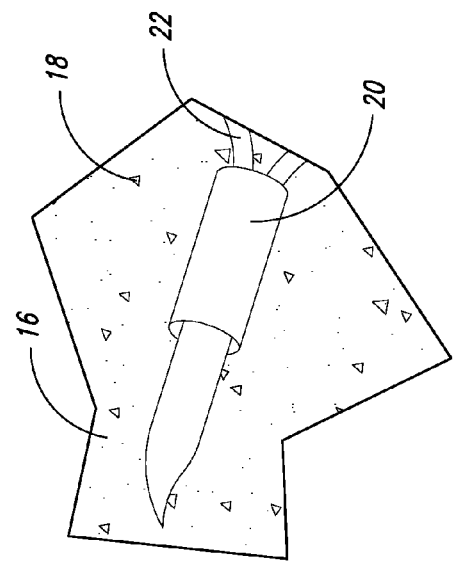
FIG. 11B is an enlarged perspective view of an interior surface of the lighted display illustrated in FIG. 11A.
Figure 11A:
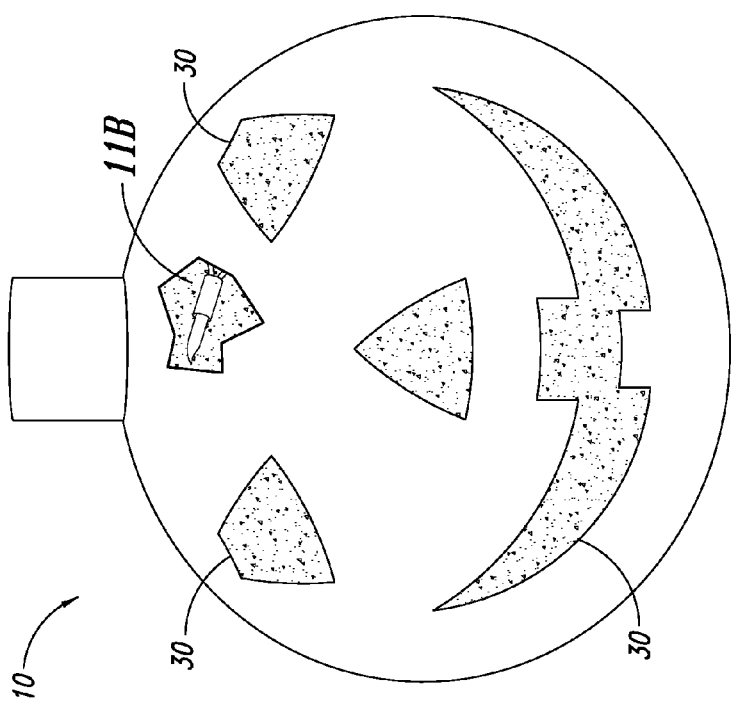
FIG. 11A is a perspective view of a lighted display according to an embodiment of the present invention.

FIGS. 11A and 11B illustrate another embodiment of the device, in the form of a pumpkin, with openings 30 in the shape of the eyes, nose, and mouth of the pumpkin. In this embodiment, the exterior layer 14 has an orange color, and, as best shown in FIG. 11B, a back half of an internal surface of the display 10 is covered with glitter or other refractive substance and has a purple color. When internally illuminated, light refracted off the back half of the pumpkin is visible through the openings 30.

Figure 12:
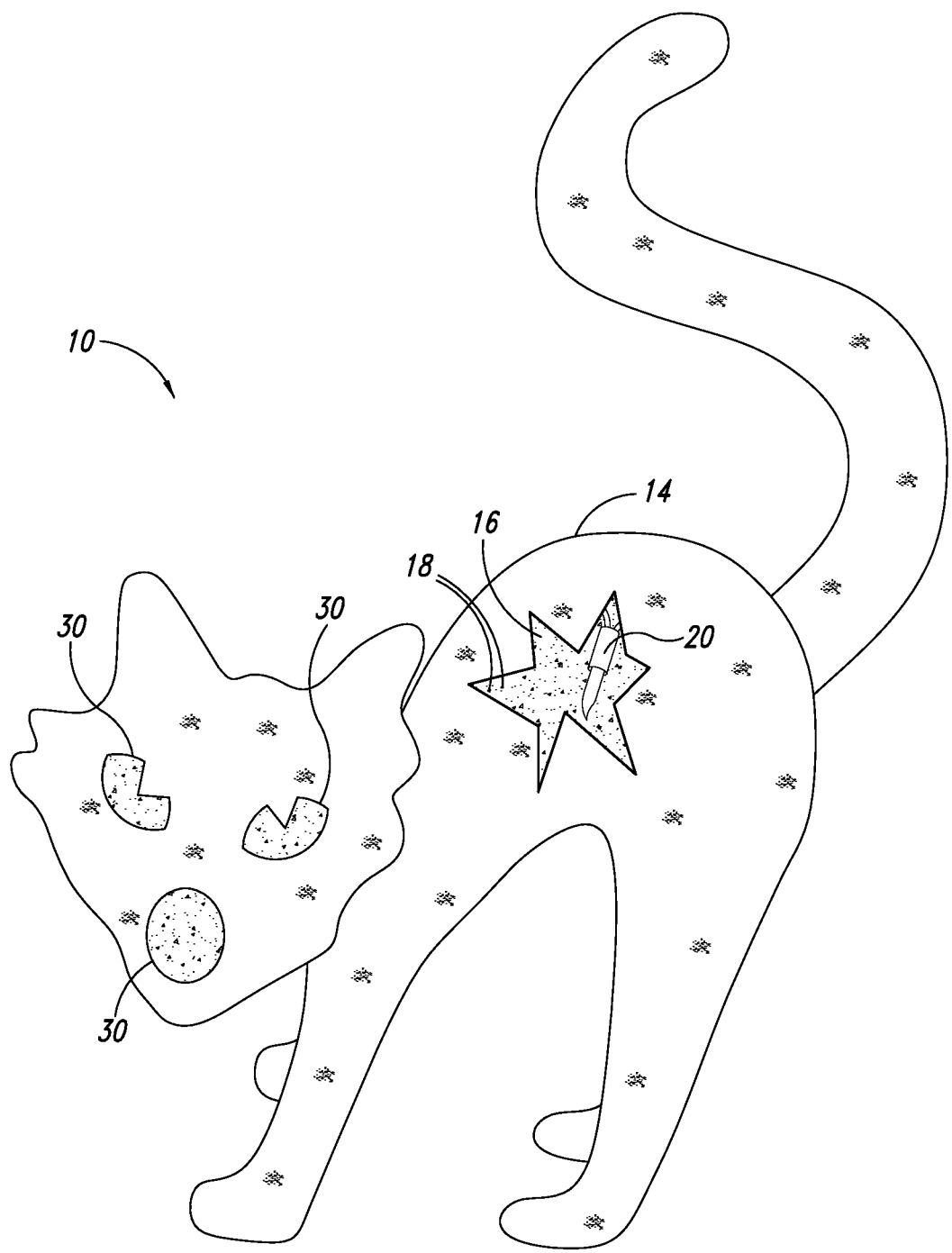
FIG. 12 is a perspective view of a lighted display according to an embodiment of the present invention.

FIG. 12 illustrates another embodiment of the device, in which the display 10 is in the shape of a cat, with openings 30 in the form of the eyes and mouth of the cat. In this embodiment, the exterior layer 14 has a black color. At least a portion of the interior surface of the display 10 that is visible through the openings 30 includes a red coating embedded with glitter or other refractive substance. The display 10 in this embodiment includes multiple lighting elements 20 that serve to illuminate the display through the sheer exterior layer 14, as depicted in the form of the darker colored pattern in FIG. 12, and also reveal a brilliant display of the coated internal surface through the openings 30. In addition, the red coating provides an elegant red tint to select portions of the otherwise black cat.

Many of the techniques and elements discussed above in isolation can also be employed in combination with each other without deviating from the scope of the invention. For example, as discussed below, FIGS. 13 and 14 illustrate layers that are coated on both an interior and exterior side as well as layers coated and treated in a manner that bends and/or breaks up light not only when it collides with the outside of the display, but also as it leaves the display and passes through the coating 16 and the light bending particles 18.

Figure 13A:
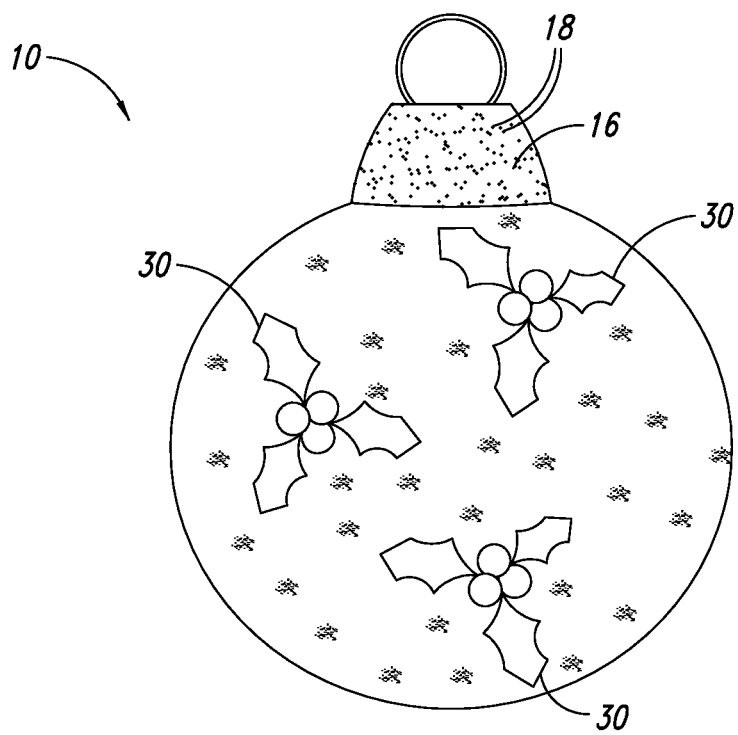
FIG. 13A is a perspective view of a lighted display according to an embodiment of the present invention.
Figure 13B:
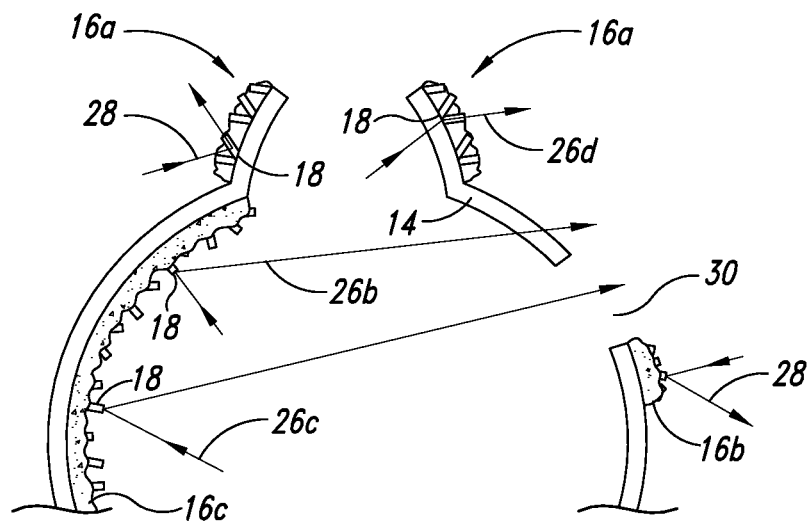
FIG. 13B is a schematic drawing illustrating a cutaway side view of the external layer of the lighted display of FIG. 13A, during operation.

FIGS. 13A and 13B illustrate an embodiment of the device, in which the display 10 is in the shape of a holiday ornament. A top portion of the ornament has a golden color, the body of the ornament is white, and there are several designs in the shape of holly berries and leaves. The design for the holly berries is realized via a red coating on the exterior of the ornament, and the shape for the holly leaves is realized by openings 30 in the exterior surface of the ornament. A portion of the interior of the ornaments is coated in a manner that reveals a green surface through the leaf-shaped openings.

As shown in the schematic view in FIG. 13B, the coatings used for the golden color on the top of the ornament, the red color for the holly berries on the exterior of the ornament, and the green color on the interior of the ornament combine several different aspects of the present invention discussed above. For example, an exterior surface of the sheer layer 14 of the top of the ornament is at least partially coated with a coating 16a that includes light bending particles 18 positioned to allow internally generated light beams 26d to leave the display by passing through the coating 16a and the light bending particles 18. The holly berry effect is created by coating the exterior surface of the ornament with a coating 16b that includes light bending particles 18 positioned to refract and reflect external light beams 28. The green color for the holly leaves is achieved via a coating 16c on the interior surface of the sheer layer 14 embedded with light bending particles 18 positioned such that internal light reflects off of the light bending particles 18 and out the leaf-shaped openings 30 (light beam 26c) or through the uncoated portions of the shear material 14 (light beam 26b). An attractive green tint is also imparted on the sheer layer 14 by the coating 16c and light bending particles 18.

Figure 14A:
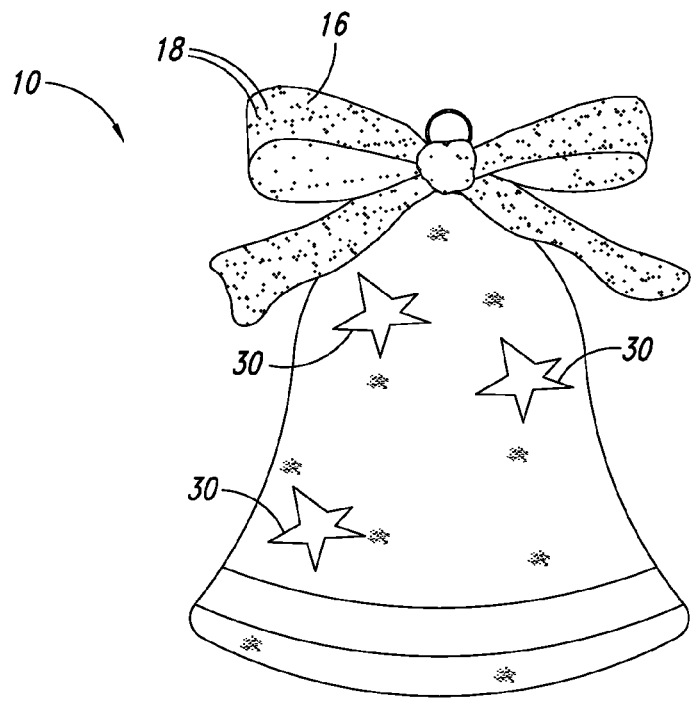
FIG. 14A is a perspective view of a lighted display according to an embodiment of the present invention.
Figure 14B:
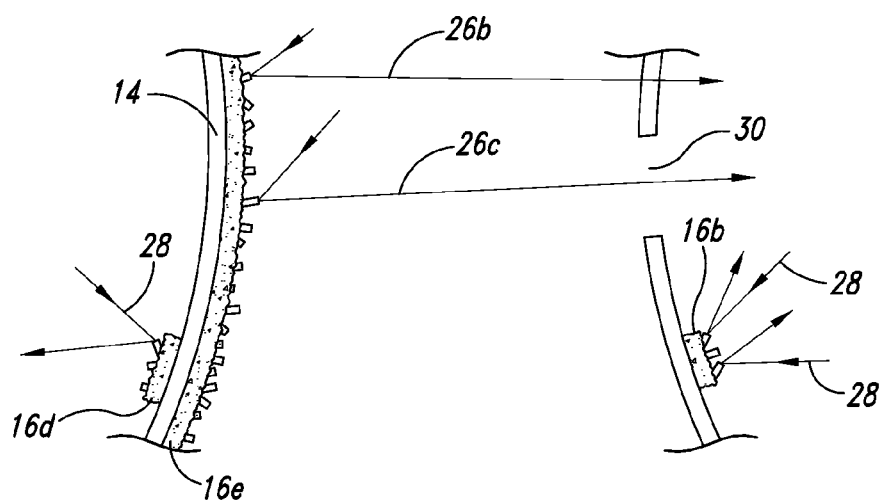
FIG. 14B is a schematic drawing illustrating a cutaway side view of the external layer of the lighted display of FIG. 14A, during operation.

FIGS. 14A and 14B illustrate an embodiment of the device, in which the display 10 is in the shape of a bell, with an attaching silver colored bow at the top of the bell. The bell is at least partially covered in a shear layer 14 having a red color and includes several openings 30 in the shape of stars. As best seen in the schematic view in FIG. 14B, a bottom portion of the exterior of the bell includes a silver colored coating 16d that includes several light bending particles 18. At least a portion of the interior surface of the layer 14 is coated with a silver coating 16e that includes several light bending particles 18, which refract and reflect external light beams 28 and internal light beams 26b and 26c. The coating 16 is visible through the star-shaped openings 30, and adds to the sparkling effect of the display when lit from the interior. Specifically, internal light refracts off of the light bending particles and out the star-shaped openings 30 (light beam 26c) or through the uncoated portions of the shear material 14 (light beam 26b).

Figure 16:
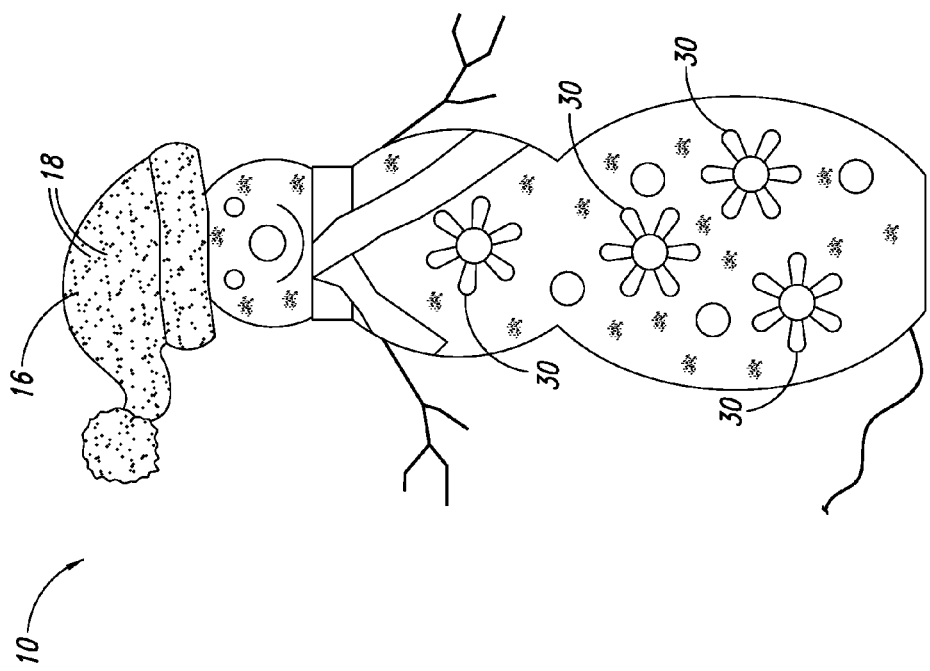
FIG. 16 is a perspective view of a lighted display according to an embodiment of the present invention.
Figure 15:
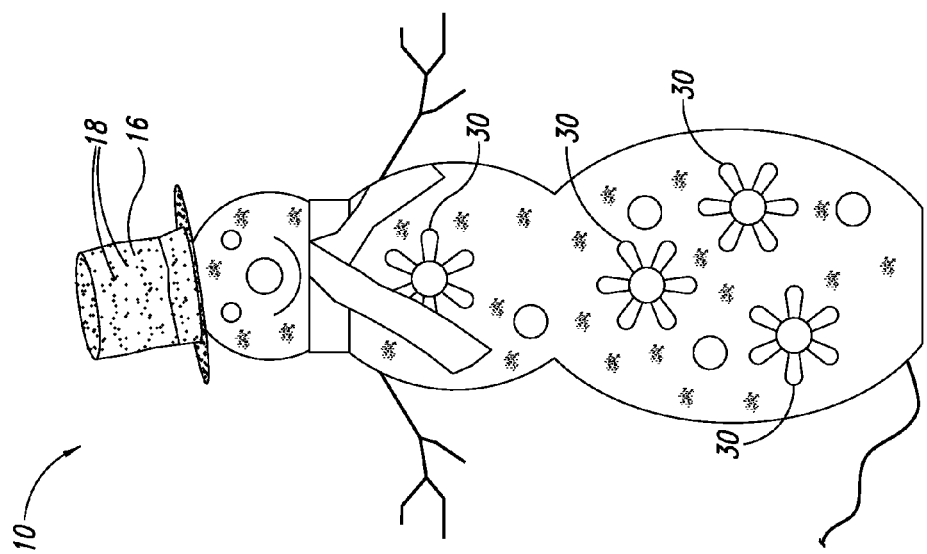
FIG. 15 is a perspective view of a lighted display according to an embodiment of the present invention.

FIGS. 15 and 16 illustrate displays 10 in the shape of snowmen. The snowmen bodies include several openings in the shape of snowflakes that reveal coatings on an internal surface of each display. The coatings can take any color so as to achieve the desired effect. For example, in FIG. 15, the internal coating is blue, whereas the display in FIG. 16 includes a red coating.

Figure 17A:
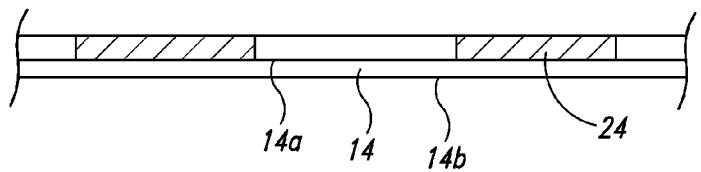
FIGS. 17A-17I are a series of schematic drawings sequentially illustrating some of the steps in a process of applying a coating to an exterior surface of an external layer of a lighted display, applying a coating to an interior surface of the external layer, and mounting the external layer to the lighted display according to an embodiment of the present invention.
Figure 17B:
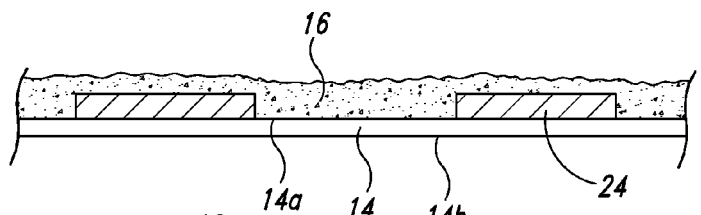
Figure 17C:
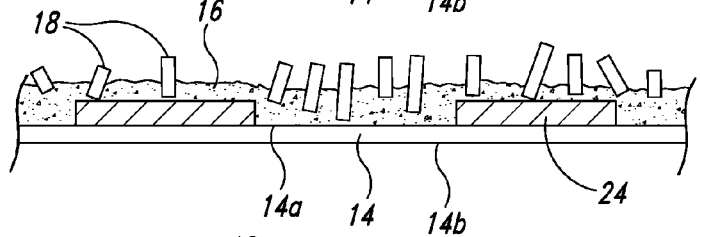
Figure 17D:
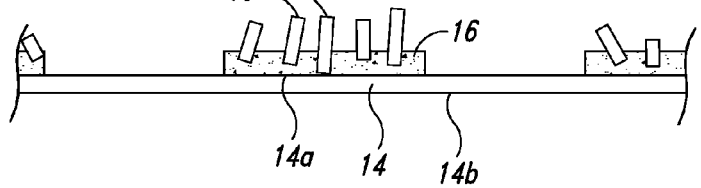

FIGS. 17A-17I consecutively illustrate one method of manufacturing the display 10 so as to include coatings on both an interior and exterior surface, on selected portions of the device. Although the method illustrated in FIG. 17 describes screen printing opposite sides of the sheer layer 14 in two discrete steps, as will be readily understood by one of ordinary skill in the art, it is also possible to perform the screen printing of both sides at the same time. In FIG. 17A, a screen 24 is placed over portions of an external surface 14a of a sheer layer 14. In FIG. 17B, a liquid or other form of coating 16 is applied over the top of the sheer layer 14 and the screen 24. In FIG. 17C, the light bending particles 18 have been distributed across the top surface of the coating 16 before the coating has dried. In FIG. 17D, the screen 24 has been removed, leaving the coating 16 with the light bending particles 18, in the desired pattern or shape, on external surface 14a of the sheer layer 14.

Figure 17E:
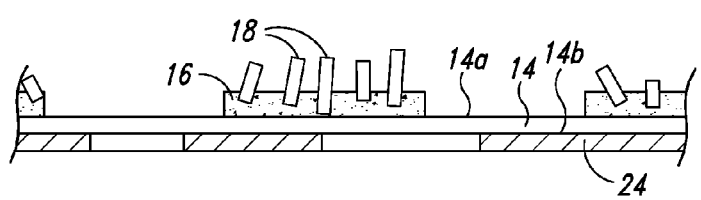
Figure 17F:
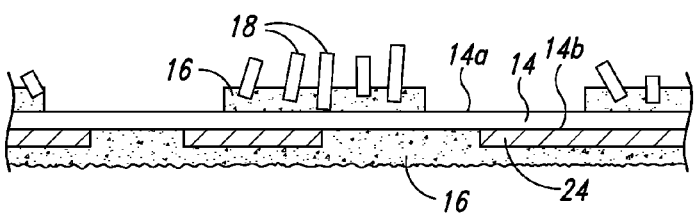
Figure 17G:
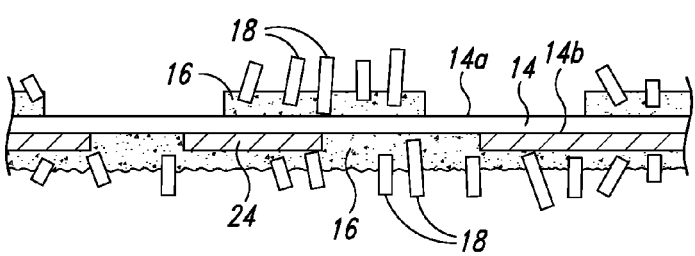
Figure 17H:
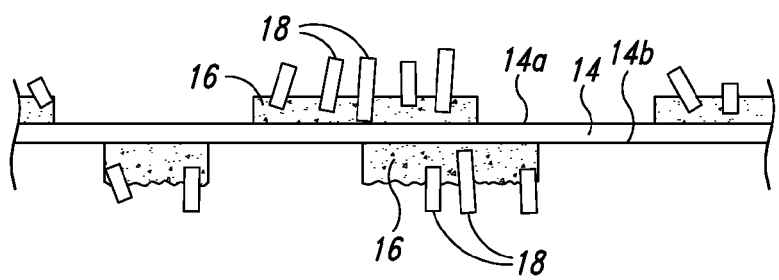

The process is then repeated for the reverse side of the sheer layer 14. In FIG. 17E, a screen 24 is placed over portions of the internal side 14b of the sheer layer 14. In FIG. 17F, a liquid or other form of coating 16 is applied over the internal surface 14b of the sheer layer 14 and the screen 24. In FIG. 17G, the light bending particles 18 have been distributed across the top surface of the coating 16 before the coating has dried. In FIG. 17H, the screen 24 has been removed, leaving the coating 16 with the light bending particles 18 embedded therein, in the desired pattern or shape, on the internal surface 14b of the sheer layer 14.

Figure 17I:
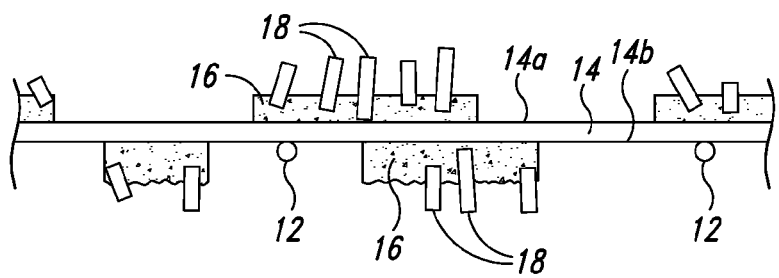

Finally, in FIG. 17I, the sheer layer 14 having coatings on both the external surface 14a and the internal surface 14b is affixed to the rods 12 of the frame of the display by any one of the various techniques described above.

FIGS. 18A-18F consecutively illustrate another method of manufacturing the display 10 so as to include coatings on both an interior and exterior surface of the device. In this embodiment, a single side of the sheer layer 14 is coated, the sheer layer 14 is then affixed to the rods 12 of the frame, and then the interior of the display 10, including both the rods 12 and the interior surface of the sheer layer 14b, are coated. This technique advantageously provides more continuity between the appearance of the rods 12 and the interior surface of the sheer layer 14b, as both interior elements of the display 10 are coated at the same time.

Figure 18A:
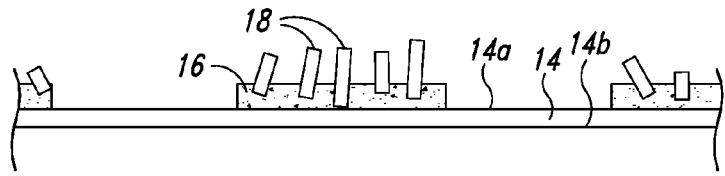
FIGS. 18A-18F are a series of schematic drawings sequentially illustrating some of the steps in a process of applying a coating to an exterior surface of an external layer of a lighted display, mounting the external layer to the lighted display, and applying a coating to an interior surface of the mounted external layer according to an embodiment of the present invention.
Figure 18B:
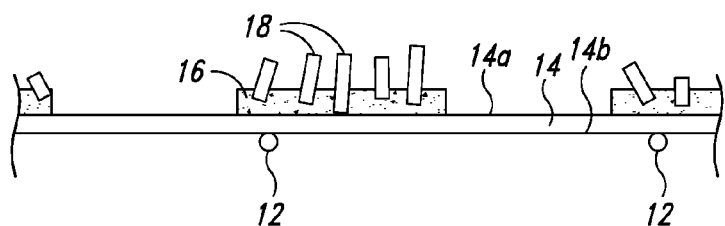
Figure 18C:
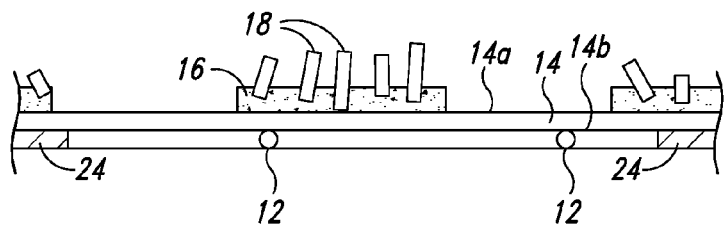
Figure 18D:
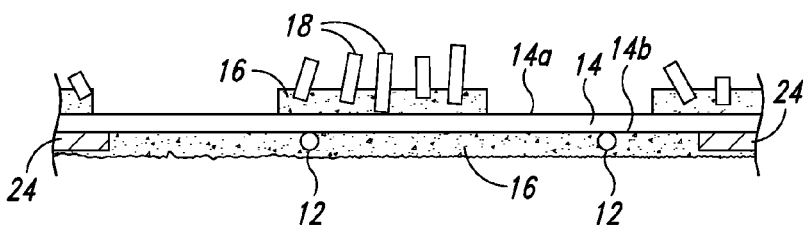
Figure 18E:
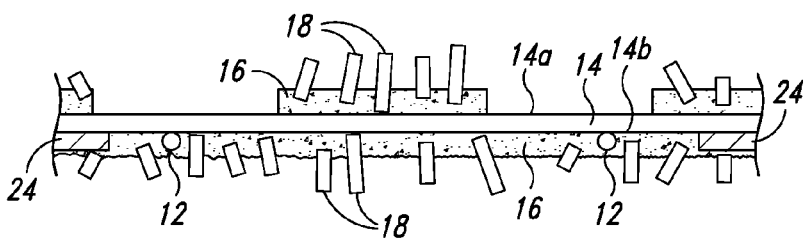
Figure 18F:
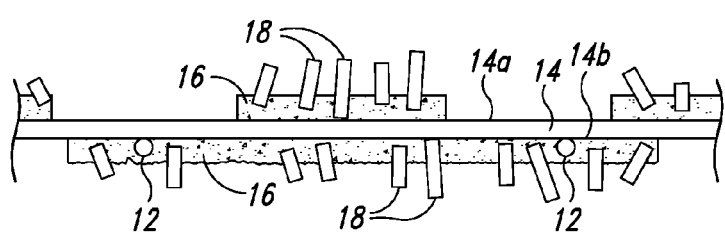

FIG. 18A illustrates a sheer layer 14 that includes several coatings 16 embedded with light bending particles 18 on an external surface 14a. In FIG. 18B, the sheer layer 14 is positioned and affixed to the rods 12 of the frame of the display by any one of the various techniques described above. Next, FIGS. 18C-18F illustrate a technique of screen printing both the interior surface 14b of the sheer layer 14 and the rods 12 with a coating 16 and then subsequently embedding the coating 16 with light bending particles 18. In FIG. 18C, a screen 24 is placed over portions of the internal side 14b of the sheer layer 14. In FIG. 18D, a liquid or other form of coating 16 is applied over the internal surface 14b of the sheer layer 14, at least a portion of the exposed surfaces of the rods 12, and the screen 24. In FIG. 18E, the light bending particles 18 have been distributed across the top surface of the coating 16 before the coating has dried. In FIG. 18F, the screen 24 has been removed, leaving the coating 16, with the light bending particles 18 distributed therein, in the desired pattern or shape, on the internal surface 14b of the sheer layer 14 and the rods 12.

As will be readily understood by one of ordinary skill in the art, although the technique in FIGS. 18C-18F is described as a screen printing process, any other known screening or application technique can be used to apply a coating embedded with light bending particles to both the interior surface 14b of the sheer layer 14 and the rods 12. Further, the variations discussed above in each of the other embodiments are equally applicable to this embodiment. For example, as an alternative to spreading the light bending particles 18 in the coating 16 before the coating 16 dries, an adhesive could be applied to the coating 16 after the coating has dried, and the light bending particles 18 can be distributed about the adhesive.

Figure 19A:
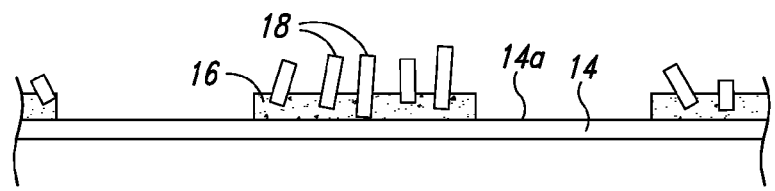
FIGS. 19A-19C are a series of schematic drawings sequentially illustrating some of the steps in a process of mounting a coated external layer and a coated internal layer to the lighted display according to an embodiment of the present invention.
Figure 19B:
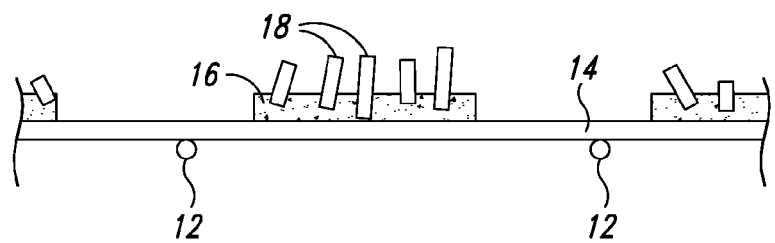
Figure 19C:
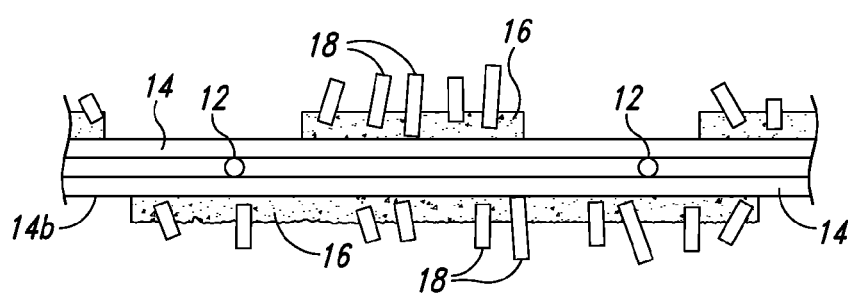

FIGS. 19A-19C consecutively illustrate another method of manufacturing the display 10 so as to include coatings on portions of both an interior and exterior surface of the device. In this embodiment, two separate sheer layers 14 are provided that each has a coating on a single surface. The two separate sheer layers are then mounted on the frame of the display 10 such that the coated surface of one of the sheer layers 14 is positioned on an exterior surface of the display, the coated surface of the other sheer layer 14 is positioned on an interior surface of the display, and the rods 12 are sandwiched between the two layers. This technique provides the dual benefits of a simplified process and a more uniform interior appearance.

FIG. 19A illustrates a sheer layer 14 that includes several coatings 16 embedded with light bending particles 18 on an external surface 14a. In FIG. 19B, the sheer layer 14 having coatings on the external surface 14a is affixed to the rods 12 on an external side of the frame of the display by any one of the various techniques described above. In FIG. 19C, a sheer layer 14 that includes several coatings 16 embedded with light bending particles 18 on an internal surface 14b is affixed to the rods 12 on an internal side of the frame of the display by any one of the various techniques described above. The resulting structure provides a more continuous visual appearance.

In an alternative to the example in FIG. 19C, a more rigid, opaque, insert piece can be used instead of a sheer layer 14. The insert piece can be made of, for example, cardboard, paper, or plastic material. The insert piece can be of any desired color and can be coated with light refracting particles by, for example, applying an adhesive to the surface of the insert piece and then coating the adhesive with, for example glitter. Then, the insert piece can be secured to an interior of the display so as to provide a brilliant effect when viewed through the openings in the display. Advantageously, the insert piece can be sized and shaped so as to make a selected portion of the lighted display opaque, with a tint of the color of the insert piece, when viewed from a side of the lighted display that is opposite the side of the lighted display that includes the openings.

As used herein, the term layer is a term used to help delineate the spatial relationship of one material to another. Accordingly, the term layer does not require the layer to be contiguous, a single thickness, or in a single plane.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A decorative lighting fixture comprising:
   a frame having at least a structural element adapted to form a desired three dimensional shape that includes an interior and an exterior;
   a light source;
   a sheer layer extended over at least a portion of the frame such that a light from the light source passes through at least a portion of the sheer layer as the light enters or exits the fixture;
   a coating located on at least a portion of an internal surface of the decorative lighting fixture;
   a plurality of light bending particles coupled to the coating such that light colliding with the light bending particles is altered to create a desired visual effect;
   at least one opening in the decorative lighting fixture that is not covered by the sheer layer and through which a portion of the internal surface of the decorative lighting fixture is visible from an exterior of the decorative lighting fixture during operation of the decorative lighting fixture,
   wherein the coating of the internal surface of the decorative lighting fixture is at least partially within the portion of the internal surface of the decorative lighting fixture that is visible through the at least one opening in the decorative lighting fixture.

2. The decorative lighting fixture of claim 1 wherein the light source is an internal light source that is positioned within the frame.

3. The decorative lighting fixture of claim 1, wherein the opening in the decorative lighting fixture has a shape that corresponds to the desired three dimensional shape of the decorative lighting fixture, the shape of the opening being a mouth, an eye, or a nose.

4. The decorative lighting fixture of claim 1, wherein the portion of the internal surface of the decorative lighting fixture that is visible from the exterior of the decorative lighting fixture during operation of the decorative lighting fixture is located on an opposite side of an interior space of the decorative lighting fixture with respect to the opening in the decorative lighting fixture.

5. The decorative lighting fixture of claim 1 wherein the coating is located on an internal surface of the sheer layer.

6. The decorative lighting fixture of claim 1, further comprising an insert piece positioned within the frame opposite the at least one opening in the decorative lighting fixture, the insert piece including an internal surface that faces the interior of the decorative lighting fixture, and an external surface that faces the sheer layer,
   wherein the coating is located on the internal surface of the insert piece at least partially within the portion of the internal surface of the decorative lighting fixture that is visible through the at least one opening in the decorative lighting fixture.

7. The decorative lighting fixture of claim 1 wherein the internal coating extends over a portion of the frame that is within the portion of the internal surface of the decorative lighting fixture that is visible through the at least one opening in the decorative lighting fixture.

8. The decorative lighting fixture of claim 1, further comprising an external coating located on an external surface of the sheer layer such that the external coating is visible on an external surface of the decorative lighting fixture.

9. The decorative lighting fixture of claim 1, further comprising:
   an external sheer layer that extends over an exterior of the frame; and
   an external coating located on an external surface of the sheer layer such that the external coating is visible on the external surface of the decorative lighting fixture,
   wherein the sheer layer is an internal sheer layer that extends over an interior of the frame so as to cover at least a portion of the frame within the portion of the internal surface of the decorative lighting fixture that is visible through the at least one opening in the decorative lighting fixture.

10. The decorative lighting fixture of claim 1 wherein the at least one opening is configured to diffract at least some of the light entering or exiting the decorative lighting fixture.

11. The decorative lighting fixture of claim 1 wherein at least some of the light bending particles project outward from the coating, outside of the fixture, such that at least some of the light contacting the decorative lighting fixture from the outside is altered by the light bending particles.

12. The decorative lighting fixture of claim 1 wherein at least some of the light bending particles extend through the coating, such that at least some of the light exiting the decorative lighting fixture is altered by the light bending particles.

13. The decorative lighting fixture of claim 1 wherein the sheer layer comprises a woven fabric.

14. The decorative lighting fixture of claim 1 wherein the light bending particles are treated to create a holographic effect.

15. The decorative lighting fixture of claim 1 wherein the light bending particles are treated to create a spectral effect.

16. The decorative lighting fixture of claim 1 wherein the frame is fabricated from a plurality of rods.

17. The decorative lighting fixture of claim 1 wherein the coating is treated to be different colors in different locations on the decorative lighting fixture.

18. The decorative lighting fixture of claim 1 wherein the sheer layer comprises, a mesh having portions of material and open spaces.

19. The decorative lighting fixture of claim 1 wherein the sheer layer is treated to be different colors in different locations on the decorative lighting fixture.

20. The decorative lighting fixture of claim 1 wherein the frame is adapted to have the appearance of an animal.

21. The decorative lighting fixture of claim 1 wherein the light bending particles comprise a light refracting material.

22. The decorative lighting fixture of claim 1 wherein the light bending particles extend partially through the coating.

23. The decorative lighting fixture of claim 1 wherein the light source is a plurality of light bulbs.

24. The decorative lighting fixture of claim 1 wherein the light source is a light bulb.

25. A method for making a decorative lighting fixture, the method comprising:
   providing a sheer layer;
   manufacturing a frame in a three dimensional shape that includes an interior and an exterior;
   coupling lighting elements to the frame;
   wrapping the sheer layer over at least a portion of the frame; and
   applying a coating embedded with light bending particles on at least a portion of an interior surface of the sheet layer of the decorative lighting fixture.

26. The method of claim 25 wherein the coating is applied to the sheer layer before the sheer layer is wrapped over the frame.

27. The method of claim 25 wherein the coating is also applied to an exterior surface of the sheer layer.

28. The method of claim 25 wherein wrapping the sheer layer over at least the portion of the frame includes defining at least one opening in the decorative lighting fixture that this not covered by the sheer layer and through which a portion of the internal surface of the decorative lighting fixture is visible from an exterior of the decorative lighting fixture during operation of the decorative lighting fixture.

29. A method for making a decorative lighting fixture, the method comprising:
   providing a sheer layer;
   manufacturing a frame in a three dimensional shape that includes an interior and an exterior;
   coupling lighting elements to the frame;
   wrapping the sheer layer over at least a portion of the frame to define at least one opening in the decorative lighting fixture that is not covered by the sheer layer and through which a portion of the internal surface of the decorative lighting fixture;
   positioning a coating embedded with a light bending particles on at least a portion of an interior surface of the sheet layer of the decorative lighting fixture; and
   mounting an insert piece within the frame opposite the at least one opening in the decorative lighting fixture, the insert piece including an internal surface that faces the interior of the decorative lighting fixture, and an external surface that faces the sheer layer,
   wherein positioning the coating includes applying the coating to the internal surface of the insert piece such that the coating will be at least partially within the portion of the internal surface of the decorative lighting fixture that is visible through the at least one opening in the decorative lighting fixture during operation of the decorative lighting fixture.

30. A method for making a decorative lighting fixture, the method comprising:

providing a sheer layer;
manufacturing a frame in a three dimensional shape that includes an interior and an exterior;
coupling lighting elements to the frame;
wrapping the sheer layer over at least a portion of the frame to define at least one opening in the decorative lighting fixture that this not covered by the sheer layer and through which a portion of the internal surface of the decorative lighting fixture is visible from an exterior of the decorative lighting fixture during operation of the decorative lighting fixture;
positioning a coating embedded with light bending particles on at least a portion of an interior surface of the sheet layer of the decorative lighting fixture;
providing an internal sheer layer; and
wrapping the internal sheer layer over at least a portion of an interior of the frame, and
wherein positioning the coating includes applying the coating to an internal surface of the internal sheer layer such that the coating will be at least partially within the portion of the internal surface of the decorative lighting fixture that is visible through the at least one opening in the decorative lighting fixture during operation of the decorative lighting fixture.

31. The method of claim 25 wherein applying the coating includes embedding the coating with light bending particles, and the light bending particles are distributed about the coating before the sheer layer is wrapped over the frame.

32. The method of claim 25 wherein applying the coating includes embedding the coating with light bending particles, and the light bending particles are distributed about the coating before the coating dries.

33. The method of claim 25 wherein positioning the coating includes embedding the coating with light bending particles, and the light bending particles are treated, finished or processed to have a desired optical characteristic.

* * * * *

UNITED STATES PATENT AND TRADEMARK OFFICE
CERTIFICATE OF CORRECTION

PATENT NO. : 8,960,943 B2
APPLICATION NO. : 13/589980
DATED : February 24, 2015
INVENTOR(S) : Jessica Wang It is certified that error appears in the above-identified patent and that said Letters Patent is hereby corrected as shown below:

In The Claims

Column 12, line 50:
"lighting fixture;" should read, --lighting fixture is visible from an exterior of the decorative lighting fixture during operation of the decorative lighting fixture;--.

Signed and Sealed this
Twenty-second Day of March, 2016

Michelle K. Lee
*Director of the United States Patent and Trademark Office*